United States Patent
Prater et al.

(10) Patent No.: US 12,332,168 B2
(45) Date of Patent: Jun. 17, 2025

(54) METHOD AND APPARATUS FOR IMPROVED COMPOSITE MULTI-WAVELENGTH PHOTOTHERMAL INFRARED IMAGING

(71) Applicant: Photothermal Spectroscopy Corp., Santa Barbara, CA (US)

(72) Inventors: Craig Prater, Santa Barbara, CA (US); Kevin Kjoller, Santa Barbara, CA (US)

(73) Assignee: Photothermal Spectroscopy Corp., Santa Barbara, CA (US)

(*) Notice: Subject to any disclaimer, the term of this patent is extended or adjusted under 35 U.S.C. 154(b) by 309 days.

(21) Appl. No.: 18/171,161

(22) Filed: Feb. 17, 2023

(65) Prior Publication Data

US 2024/0280477 A1     Aug. 22, 2024

(51) Int. Cl.
  *G01N 21/35* (2014.01)
  *G06T 5/50* (2006.01)
  *G06V 10/141* (2022.01)
  *H04N 23/20* (2023.01)

(52) U.S. Cl.
  CPC .............. *G01N 21/35* (2013.01); *G06T 5/50* (2013.01); *G06V 10/141* (2022.01); *H04N 23/20* (2023.01); *G06T 2207/10024* (2013.01); *G06T 2207/10048* (2013.01); *G06T 2207/20221* (2013.01)

(58) Field of Classification Search
  None
  See application file for complete search history.

(56) References Cited

U.S. PATENT DOCUMENTS

| | | |
|---|---|---|
| 4,867,563 A | 9/1989 | Wurm |
| 5,418,363 A | 5/1995 | Elings |
| 9,091,594 B2 | 7/2015 | Furstenberg |
| 9,841,324 B2 | 12/2017 | Furstenberg |
| 10,677,722 B2 | 6/2020 | Li |
| 10,809,184 B1 | 10/2020 | Prater |
| 10,942,116 B2 | 3/2021 | Prater |
| 11,002,665 B2 | 5/2021 | Prater |
| 2004/0006275 A1* | 1/2004 | Demos .............. A61B 1/043 600/476 |
| 2012/0025099 A1 | 2/2012 | Yelin |
| 2012/0204296 A1* | 8/2012 | Prater ............... G01N 21/3563 850/6 |
| 2018/0059137 A1* | 3/2018 | Prater .................... G01Q 30/02 |
| 2020/0073103 A1 | 3/2020 | Wang |
| 2021/0003504 A1 | 1/2021 | Li |
| 2021/0164894 A1 | 6/2021 | Prater |
| 2022/0189611 A1* | 6/2022 | Farkash ............... A61C 9/0053 |
| 2022/0357275 A1 | 11/2022 | Prater |

OTHER PUBLICATIONS

Xie et al., "Dual-Color Peak Force Infrared Microscopy" Analytical Chemistry, American Chemical Society. Dec. 28, 2021.
International Search Report and Written Opinion, Application No. PCT/US2024/016199, mailed Jun. 18, 2024, 21 pages.

* cited by examiner

Primary Examiner — Marcus H Taningco
(74) Attorney, Agent, or Firm — MERCHANT & GOULD P.C.

(57) ABSTRACT

Methods described herein provide improvements on composite infrared absorption imaging. Scanning patterns described herein reduce erroneous measurements caused by thermal drift, as well as optical interference that occurs between light scattering from the top surface of the sample and light scattering from an underlying substrate.

14 Claims, 6 Drawing Sheets

METHOD AND APPARATUS FOR IMPROVED COMPOSITE MULTI-WAVELENGTH PHOTOTHERMAL INFRARED IMAGING

TECHNICAL FIELD

Embodiments disclosed herein generally relate to investigating or analyzing materials using optical systems, such as by using infrared, visible, or ultraviolet light. Embodiments described herein relate to imaging and spectroscopy, and, more particularly, to enhancements to photothermal imaging and spectroscopy systems and techniques for acquiring spectral information indicative of the optical properties and/or material or chemical composition of a sample, for example, information that correlates to an infrared (IR) absorption spectrum.

BACKGROUND

Infrared (IR) spectroscopy is a powerful technique for chemical characterization and analysis of materials, including the mapping and identification of chemical species in complex environments, for example biological materials. Infrared spectroscopy operates by illuminating a sample with a beam of infrared radiation and then measuring the amount of light absorbed, transmitted, reflected and/or scattered from the sample. Specific frequencies of infrared light, especially within the mid-infrared light band (2.5-20 µm in wavelength) correspond to vibrational frequencies in molecular bonds. Thus, when a sample is illuminated by mid-IR light, it will absorb light at IR radiation frequencies corresponding to specific molecular vibration of chemical species in the sample. By measuring the absorption of IR light by a sample as a function of IR frequency (i.e., an IR absorption spectrum) the pattern of absorption peaks provides a "fingerprint" that can be used to characterize and/or identify chemical species in the sample.

Optical Photothermal Infrared (OPTIR) spectroscopy is an emerging field that provides chemical analysis using infrared spectroscopy with a spatial resolution ten or more times finer than conventional Fourier Transform Infrared (FTIR) spectroscopy. OPTIR achieves higher spatial resolution than conventional IR spectroscopy by using a shorter wavelength "probe beam" to sense photothermal distortions in infrared absorbing regions of the sample. Various OPTIR techniques are described, for example, in U.S. Pat. Nos. 9,091,594, 9,841,324, and 10,677,722, 11,002,665, 10,942,116, and 10,809,184, each of which are incorporated herein by reference in their entireties.

SUMMARY

The above summary is not intended to describe each illustrated embodiment or every implementation of the subject matter hereof. The figures and the detailed description that follow more particularly exemplify various embodiments.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Definitions

For purposes of this specification, the following terms are specifically defined as follows:

An "analyzer/controller" refers to a system to facilitate data acquisition and control of an autofluorescent photothermal infrared (AF-PTIR) system. The analyzer/controller may be a single integrated electronic enclosure or may comprise multiple distributed elements. The control elements may provide control for positioning and/or scanning of the fiber probe and/or sample. They may also collect data about the probe beam deflection, motion or other response, provide control over the excitation and/or probe power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. A memory configured to store computer programs may be implemented along with discrete circuit components to carry out one or more of the processes described herein.

"Beam combiner" means an optical element that can combine two beams onto the same optical path. A dichroic mirror or filter for example can be used as a beam combiner where the dichroic can be configured to transmit one or more wavelength range and reflect one or more other wavelength ranges. Two beams arranged for example at right angles incident on the dichroic can then combine two beams onto the same path. In one configuration, a beam combiner may be a beam splitter used in a reverse direction, i.e., combining one beam that reflects off the beam splitter interface with another beam that is transmitted through the beam splitter interface. A beam splitter cube, for example, can be used as both a beam splitter and a beam combiner. Optical elements that are marketed as beam splitters can be used as a beam combiner, even if they are not used to split light onto two paths. For example, a Mach-Zehnder interferometer uses one beam splitter to split incident light onto two paths and a second beam splitter to recombine the two beams. In this case, the second beam splitter is being used as a beam combiner. In a Michelson interferometer, a single beam splitter is used to both divide the incident light and then recombine it. Thus, the beam splitter in a Michelson interferometer as being used as both a beam splitter and a beam combiner. A beam combiner can also be an optical fiber-based device, for example combining the light from two input fibers into one output fiber, for example a 1×2 fiber coupler. A single 1×2 fiber coupler can be used as both a beam splitter and a beam combiner.

"Beam splitter" refers to an optical element that can divide light onto at least two paths. A beam splitter can comprise a plate, a cube and/or a prism or other shapes/configurations that can divide a beam of light. The beam splitter can comprise a thin film that is partially reflecting at the wavelength of interest such that a portion of an incident beam is reflected and another portion is transmitted. A beam splitter may be polarizing, wherein in substantially transmits light of one polarization and reflects light of an orthogonal polarization. A beam splitter may also divide light along two transmission paths based on polarization, for example in the case that the beam splitter is a Nomarski or Wollaston prism. A beam splitter may also be non-polarizing, where light is divided between two paths without substantial dependence on the polarization of the incident light. A beam splitter can also be an optical fiber-based device, for example splitting light from one input optical fiber into at least two output optical fibers, for example a 1×2 fiber coupler. A beam splitter may be a 50:50 beam splitter in which substantially equal fractions of light are directed on two different paths. They can also be unbalanced, for example a 90:10 or 70:30 or similar beam splitter that direction 90% of light on one path and 10% on another, or 70% on one path and 30% on another.

"Collecting probe light" and "collecting probe radiation" refer to collecting radiation of a probe light beam that has interacted with a sample. The probe light can be collected after reflection, scattering, transmission, evanescent wave coupling, and/or transmission through an aperture probe.

"Collimating optic" refers to any of the above optical elements arranged in a way to generally collimate radiation. In some embodiments the same optic(s) may serve as both a focusing optic and a collimating optic, for example focusing light in one direction of propagation and then recollimating the light in the opposite direction of propagation.

"Confocal microscopy" refers to a form of optical microscopy in which the light collected at a detector is confined to light that passes through a small volume within the 3D focus volume of an optical objective on a sample. Confocal microscopy is often performed by placing a "confocal aperture" at a focal plane that is equivalent with the focal plane of the sample, thus blocking stray light that does not pass through the focus volume on the sample.

A "detector" refers to a device that produces a signal indicative of the power, intensity and/or energy of light/radiation incident on the detector surface. The signal will generally be an electrical signal, for example a voltage, current and/or an electrical charge. The detector may be a photodiode, a phototransistor, a charge coupled device (CCD). In some cases, a detector may be a semiconducting detector, for example a silicon PIN photodiode. A detector may also be an avalanche photodiode, a photomultiplier tube, or any other device that produce a change in current, voltage, charge, conductivity or similar upon incidence of light. A detector may comprise a single element, multiple detector elements, for example a bi-cell or quad-cell, a linear or two-dimensional array of detector elements, including camera-based detectors. An "array-based detector" means a detector that can comprise multiple photosensitive elements, for example a linear array or 2D array of photosensitive elements, and/or a 1D or 2D array of photosensitive pixels. An array-based detector can be an optical detector comprising an array with a plurality of photosensitive elements, for example a linear array or 2D array of photodiodes, or a linear or 2D array of photosensitive pixels, for example in camera-based detectors. An array-based detector can be analog devices like a photodiode array and/or hybrid analog/digital devices like camera-based detectors. A "camera" or "camera-based detector" refers to a type of array-based photodetector comprising a plurality of photosensitive pixels. A camera may comprise one or more technology including but not limited to CCD, EM-CCD, CMOS, s-CMOS, and/or other photosensitive array technologies. The camera may support frame rates from a few frames per seconds, hundreds of frames per second, or even thousands of frames per second or higher.

"Diffraction limit" of a light beam means the minimum separation of two optical sources that can be distinguished by a detector. The Abbe diffraction limit d for a microscope having a numerical aperture NA and operating at a wavelength $\lambda$ is defined as $d=\lambda/(2\text{ NA})$. Physical restraints on the numerical aperture of a microscope prohibit very large numerical apertures, and therefore the diffraction limit of a microscope depends strongly upon the operating wavelength used for detection, with large wavelengths corresponding to relatively poor resolution and high wavelengths corresponding to increased precision.

"Demodulate" or "demodulation" refers to extracting an information-bearing signal from an overall signal, usually, but not necessarily at a specific frequency. For example, in this application, the collected probe light collected at a photo detector represents an overall signal. The demodulation process picks out the portion that is being perturbed by infrared light absorbed by the sample. Demodulation can be accomplished by a lock-in amplifier, a fast Fourier transform (FFT), a calculation of a discrete Fourier component at a desired frequency, a resonant amplifier, a narrow band bandpass filter, or any other technique that largely enhances the signal of interest while suppressing background and noise signals that are not in sync with the modulation. A demodulator may produce any of a series of signals including an amplitude and/or phase of modulation of the information bearing signal, and/or in-phase (X) or quadrature (Y) signals or any other desired signal indicative of a property of a change in the information-bearing signal.

A "demodulator" refers to a device or system that performs demodulation.

"Figure of merit" refers to any metric or indicator of the relative quality of a signal or measurement. The figure of merit can for example be a measurement sensitivity, a signal strength, a noise level, a signal to noise ratio, a background level, a signal to background ratio, any combination of these, or other metric that lets one rank the relative quality of a signal and/or measurement.

"Focusing optic" refers to one or more optical elements with the ability to focus light. A focusing optic can comprise one or more refractive lenses, curved mirrors, diffractive optics, Fresnel lenses, volume hologram, metamaterial, or any combination thereof or any other device or component capable of focusing radiation.

"Illuminate," "illuminating," and "illumination" mean to direct radiation at an object, for example a surface of a sample, the probe tip, and/or the region of probe-sample interaction. Illumination may include radiation in the infrared wavelength range, visible, and other wavelengths from ultraviolet to a millimeter or more. Illumination may include any arbitrary configuration of radiation sources, reflecting elements, focusing elements and any other beam steering or conditioning elements.

"Infrared absorption spectrum" refers to a spectrum that is indicative of the wavelength dependence of the infrared absorption coefficient, absorbance, or similar indication of IR absorption properties of a sample. An example of an infrared absorption spectrum is the absorption measurement produced by a Fourier Transform Infrared spectrometer (FTIR), i.e. an FTIR absorption spectrum. In general, infrared light will either be absorbed (i.e., a part of the infrared absorption spectrum), transmitted (i.e., a part of the infrared transmission spectrum), or reflected. Reflected or transmitted spectra of a collected probe light can have a different intensity at each wavelength as compared to the intensity at that wavelength in the probe light source. It is noted that IR measurements are often plotted showing the amount of transmitted light as an alternative to showing the amount of light absorbed. For the purposes of this definition, IR transmission spectra and IR absorption spectra are considered equivalent as the two data sets as there is a simple relationship between the two measurements.

"Infrared source" and "source of infrared radiation" refer to one or more optical sources that generates or emits radiation in the infrared wavelength range, generally between 2-25 microns. The radiation source may be one of a large number of sources, including thermal or Globar sources, supercontinuum laser sources, frequency combs, difference frequency generators, sum frequency generators, harmonic generators, optical parametric oscillators (OPOs), optical parametric generators (OPGs), quantum cascade lasers (QCLs), interband cavity lasers (ICLs), synchrotron infrared radiation sources, nanosecond, picosecond, femtosecond and attosecond laser systems, C02 lasers, microscopic heaters, electrically or chemically generated sparks, laser driven thermal light sources, and/or any other source that produces emission of infrared radiation. The source emits infrared radiation in a preferred embodiment, but it can also emit in other wavelength ranges, for example from ultraviolet to THz. The source may be narrowband, for example with a spectral width of <10 cm 1 or <1 cm 1 less, or may be broadband, for example with a spectral width of >10 cm 1, >100 cm 1 or greater than 500 cm 1. Broadband sources can be made narrow band with filters, monochromators and other devices. The infrared source can also be made up of one of discrete emission lines, e.g. tuned to specific absorption bands of target species. IR sources with narrower wavelength can be coupled together to produce an IR source with a wider wavelength range, for example a QCL and an OPO, or multiple external cavity QCL modules, or even a large array of QCL emitters.

"Interacting" in the context of interacting with a sample means that light illuminating a sample is at least one of scattered, refracted, absorbed, aberrated, diverted, diffracted, transmitted, and reflected by, through and/or from the sample.

A "lock-in amplifier" is one example of a "demodulator" (defined above) and is a device, system, and/or an algorithm that demodulates the response of a system at one of more reference frequencies. Lock-in amplifiers may be electronic assemblies that comprise analog electronics, digital electronics, and combinations of the two. They may also be computational algorithms implemented on digital electronic devices like microprocessors, field programmable gate arrays (FPGAs), digital signal processors, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

"Modulating" or "modulation" when referring to radiation incident on a sample refers to changing the infrared laser intensity at a location periodically. Modulating the light beam intensity can be achieved by means of mechanical chopping of the beam, controlled laser pulsing, and/or deflecting the laser beam, for example by a tilting mirror that is driven electrostatically, electromagnetically, with piezo actuators or other means to tilt or deform the mirror, or high-speed rotating mirror devices. Modulation can also be accomplished with devices that provide time varying transmission like acousto-optic modulators, electro-optic modulators, photo-elastic modulators, pockel cells, and the like, and more generally any electronically controllable device that can change the amplitude and/or optical phase of an incident light beam. Modulation can also be accomplished with diffraction effects, for example by diffractive MEMS-based modulators, or by high-speed shutters, attenuators, or other mechanisms that change the intensity, angle, and/or phase of the laser intensity incident on the sample. The modulation can for example comprise any form of periodic waveform, for example sinusoidal waves, square waves, pulses, triangle waves, chirps, etc. The modulation may be performed at a single modulation frequency or may be a composite of any number of desired frequency components. In some cases the modulation can also be aperiodic or comprise only single pulses. A "modulated source of radiation" is a source of radiation that comprises in some fashion the ability to modulate the optical power it delivers. A modulated source of radiation can be a source with the internal ability to pulse and/or modulate its power, a radiation source with an external trigger/modulation control, and/or a Continuous Wave (CW) radiation source coupled with an external modulator, for example a mechanical chopper, an acousto-optical modulator or any of the other modulators described above or any other suitable mechanism for varying the power delivered by the radiation source. Note that in a modulated source of radiation, the radiation source and the modulator may be physically decoupled and there may be other optical elements like lenses, mirrors, filters, etc. between the radiation source and the modulator.

A "narrowband light source" a light source with a narrow bandwidth or linewidth, for example a light of linewidth smaller than 8 cm$^{-1}$, but in general it can be a light source with a linewidth narrow enough that the linewidth does not cover a spectral range of interest of the sample.

"Optical property" refers to an optical property of a sample, including but not limited to index of refraction, absorption coefficient, reflectivity, absorptivity, real and/or imaginary components of the index refraction, real and/or imaginary components of the sample dielectric function and/or any property that is mathematically derivable from one or more of these optical properties.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light or other response of a material due to the interaction with illuminating radiation.

"OPTIR signal" means a signal indicative of a photothermal distortion and/or a temperature rise in a sample due to the absorption of IR light. The OPTIR signal can be generated by any suitable apparatus for measuring a photothermal response of an IR absorbing sample using a probe beam, including systems that measure simple changes in brightness of collected probe light or more complicated interferometric and/or holographic approaches that extract a photothermal signal based on an optical phase. In either case, the OPTIR signal can be extracted using a demodulator like a lock-in amplifier to produce an amplitude, phase, and/or frequency signal that is indicative of a temperature rise in a sample due to absorption of IR light. The OPTIR signal may also be a time domain signal, for example measuring peak-to-peak variation in a probe beam detector signal, or difference in signal levels over specified time windows (e.g. corresponding to peak and minimum IR absorption), the integrated area under a photothermal response signal or any other suitable signal. Note that in the literature OPTIR is also referred to by a variety of other names such as O-PTIR, and Mid Infrared Photothermal (MIP), Infrared Photothermal Heterodyne Imaging (IR-PHI), and other similar terms. The term "OPTIR signal" is intended to encompass a photothermal response signal generated by any of these similar approaches.

"Photothermal distortion" refers to a change in the properties of a sample due to absorption of optical energy, for example the absorption of IR radiation. The photothermal distortion may refer to a change in index of refraction, reflectivity, thermal expansion, surface distortion, or other effects that can be detected with a probe beam.

"Signal indicative of" refers to a signal that is mathematically related to a property of interest. The signal may be an analog signal, a digital signal, and/or one or more numbers stored in a computer or other digital electronic device. The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

"Spectrum" refers to a measurement of one or more properties of a sample as a function of wavelength or equivalently (and more commonly) as a function of wavenumber.

The terms "about" or "approximate" and the like are synonymous and are used to indicate that the value modified by the term has an understood range associated with it, where the range can be ±20%, ±15%, ±10%, ±5%, or ±1%.

The term "substantially" is used to indicate that a result (e.g., measurement value) is close to a targeted value, where close can mean, for example, the result is within 80% of the value, within 90% of the value, within 95% of the value, or within 99% of the value.

As the term is used throughout this disclosure, "about" or "approximately" or "substantially" can refer to spatial parameters. For example, a sample may be described as being scanned on substantially the same area, line, portion or region as a previous or subsequent scan. In this context, it should be understood that the scan is intended to capture information regarding that same line, area, portion, or region. However, there are inherent limitations on the precision of instrumentation for repeatability of any such scan. Additionally, samples may change as a function of time, due to thermal drift, Brownian motion, other kinds of diffusion, or other movement of or within the sample can cause two scans, nominally of the same part of a sample, to be different.

Composite Multi-Wavelength Photothermal Imaging

A common interest among practitioners of infrared microspectroscopy is the desire to collect infrared absorption images of a sample at one or more different infrared wavelengths, or equivalently, wavenumbers (a measurement of the frequency of infrared light). Measuring an image of the IR absorption at a given wavenumber can provide an indication of the relative concentration of a specific chemical species with a vibrational mode corresponding to infrared light at that frequency. An image at a given wavelength, however, does not uniquely map chemical concentration of the target species or even the IR absorption strength of the sample at a given wavelength. The reason is that the photothermal signal measured by the OPTIR technique can depend on a variety of additional factors including the sample thermal expansion coefficient, density, heat capacity, thermal conductivity, temperature dependence of index of refraction, and sample thickness. If any of these properties vary from one location to location on a sample, a single wavelength OPTIR IR absorption image will not necessarily show the relative concentration of certain chemical species, but may instead show the variation in one of more other sample properties mentioned above. For this reason, it is common to acquire two or more IR absorption images at different wavelengths (i.e., corresponding to different absorption bands present in a sample) and then analyzing the relative IR absorption across the different IR wavelengths.

The two most common approaches for generating such composite images are using multi-color image overlays and image ratios. In the case of a multi-color overlay, IR absorption images obtained at different wavelengths are assigned different color palettes, (e.g., red for a first wavelength, green for a second wavelength, and blue for a third wavelength). The multiple IR absorption images are then overlaid to create a composite multi-color image. Another common approach is to use a ratiometric approach where one or more images at different IR wavelengths are normalized by an image at another wavelength. In the life sciences, for example it is common to normalize IR images by an image obtained at the Amide I band around 1660 $cm^{-1}$ associated with protein absorption. So for example if one image is obtained at 1724 $cm^{-1}$ (often associated with lipids) and another at 1660 $cm^{-1}$, the ratio of images at 1724 $cm^{-1}$ to 1660 $cm^{-1}$ could in principle provide an image that is indicative of the spatial variation in the lipid to protein ratio. Because all other sample properties like sample thermal expansion coefficient, density, heat capacity, thermal conductivity, temperature dependence of index of refraction, and sample thickness are constant when only the IR wavelength is changed, it should be possible to normalize for variations in any of these properties over the images to produce a ratio image that is independent of all of these properties and only dependent on the relative IR absorption coefficient.

In practice however, we have found that both the multi-color overlay images and the ratiometric images of these conventional approaches often fail to produce the desired result of normalizing for variation in other sample properties. One reason is that there is often drift that occurs between the acquisition of the IR absorption images at different IR wavelengths. This drift originates from two main sources: (1) thermal drift in an instrument causing shifts and/or distortions in the measured vs. commanded position on a sample; and (2) motion of the sample itself, e.g. due to Brownian motion or cellular movement, for example in a live specimen. Thermal drift generally arises due to fluctuations in laboratory temperature that lead to differential movement between portions of the instrument supporting/translating the sample and other portions of the instrument that support/control the pointing of the measuring probe beam. As the room temperature changes, e.g. due to heating/air conditioning, different portions of the instrument may thermally expand/contract at different rates, resulting in changes in relative position of the sample and probe beam over time. The net result is that when two different IR absorption images are acquired sequentially at two different IR wavelengths sequentially, the pixel positions of the two images do not exactly correspond to the same locations on the sample. Similarly, if a biological sample is moving/changing at an appreciable rate, two images obtained at different times will reflect different states of the sample that can make comparison difficult.

As a result, when either a multi-color overlay or an image ratio is calculated, the resulting composite multi-wavelength image is comparing the IR absorption values at different IR wavelengths at subtly different locations on the sample. The differences can be enough to render the image ratios useless, especially if there are large variations in sample properties over small length scales in the images.

One special case of this issue occurs with the presence of thin film interference in samples. On some samples measured by OPTIR there is optical interference that occurs between light scattering from the top surface of the sample and light scattering from the underlying substrate. This interference has a semi-periodic dependence on the sample thickness that can cause a corresponding semi-periodic variation of the OPTIR sensitivity with thickness. This in turn can create variability in measured OPTIR signal levels across the sample that are not associated with the IR absorption coefficient, but rather just sample thickness variation. It has been desirable to normalize out for these thin film interference impacts on OPTIR sensitivity with ratiometric images, but to date this has been largely impractical or impossible due to thermal drift between OPTIR absorption images.

The problem associated with thermal drift can be better understood with a specific example. Consider a microscope where the drift rate of a fixed point on the sample is 10 µm/minute. If an IR image at a single IR wavelength takes 5 minutes, a subsequent image at the same commanded location will be offset from the first image by 5 minutes×10 µm/minute=50 µm. Thus any attempt to ratio the first image by the second could incur a 50 µm offset in actual sample position for the same XY pixel value. This could make a resulting ratio image nonsensical. Prior art OPTIR instruments do include the ability to perform a re-registration of subsequent images to compensate for a simple image shift as described above, but in practice, the thermal drift may not be constant over time, especially in a situation for example when the temperature of a room is fluctuating over time (e.g. due to heating or air conditioning cycling on and off). This can lead to both different amplitudes and directions of thermal drift from one image to another or even within a single image. Thus actual IR absorption images obtained sequentially may contain nonlinear scale distortions that are not simple to correct. As a result, prior art OPTIR image ratios have suffered from imperfect performance.

Figure 1A:
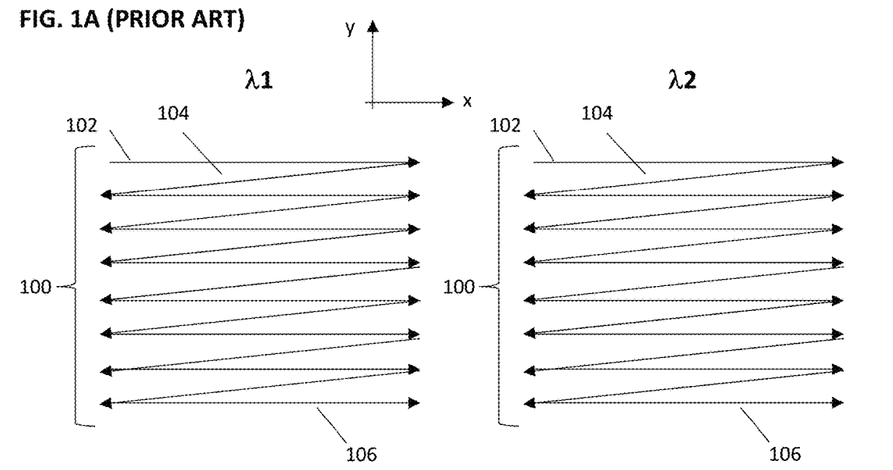
FIG. 1A is an example of composite multi-wavelength photothermal imaging scan pattern under the prior art.
Figure 1B:
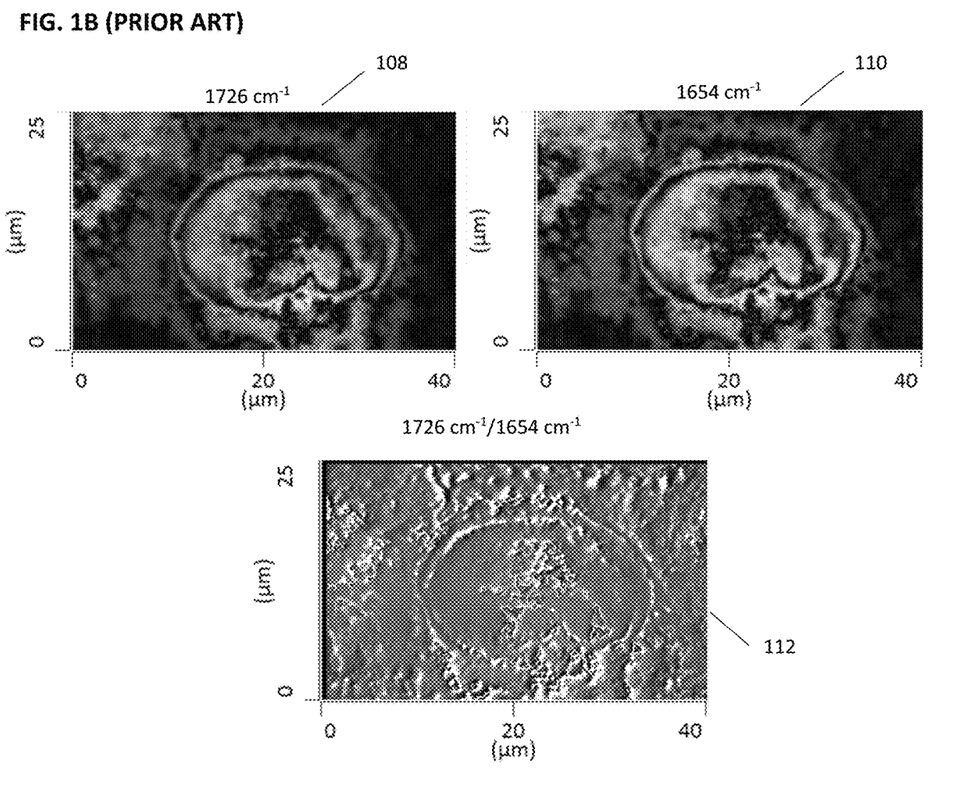
FIG. 1B shows single wavelength OPTIR images and a ratio image of a sample as measured according to the scan pattern of FIG. 1A.

FIGS. 1A and 1B show an illustration of the issue described above using prior art approaches for ratiometric imaging of OPTIR images at different infrared wavelengths. FIG. 1A shows the sequential raster scanning pattern 100 used in prior art OPTIR measurements where a first OPTIR image is taken at a first infrared wavelength $\lambda 1$ (in the left-hand side of the figure) and then a second OPTIR image is taken sequentially at a second infrared wavelength $\lambda 2$ (in the right-hand side of the figure). The prior art raster pattern 100 comprises a forward scan line 102 along a linear profile on the sample in the X direction and then a return scan line 104 in the reverse direction to the same starting location of forward scan line 102, but with an incremented Y value. Subsequent forward and return scan lines 102 and 104 are repeated with incrementing Y values until the final forward scan line 106 is completed. At this point the infrared wavelength is changed to $\lambda 2$ and the raster scan pattern is repeated. The scan at $\lambda 2$ is shown displaced to the right of the scan at $\lambda 1$ in FIG. 1A, but it should be understood that (as described above) they start at the same point and therefore the scans result in two sets of data, one at each wavelength, on the same spatial raster pattern.

At the conclusion of these two raster scan patterns, two complete images are obtained at different wavelengths. This process can be repeated for an arbitrary number of wavelengths. Example results of such a sequential scan pattern are shown in FIG. 1B. The top two images in FIG. 1B show OPTIR images acquired at two wavelengths, a first image 108 at a wavelength corresponding to 1726 cm$^{-1}$ (top-left image) and a second image 110 acquired at a wavelength corresponding to 1654 cm$^{-1}$ (top-right image). A ratiometric image 112 shows the result of dividing image 108 by image 110. Because of subtle nonlinear thermal drift between images 108 and 110, the resulting ratio image show many features that are not in fact due to differences in relative chemical concentrations, but rather due to edge effects of subtly mismatched features between the two images.

Improved Composite Multi-Wavelength Photothermal IR Imaging

This specification outlines methods for overcoming the problems of thermal drift described above to obtained improved composite multi-wavelength photothermal IR imaging using rapid wavelength shifting between successive scan lines in OPTIR images such that measurements of IR absorption profiles at two or more wavelengths are measured on timescales short enough to prevent accumulation of significant thermal drift between wavelengths.

Figure 2A:
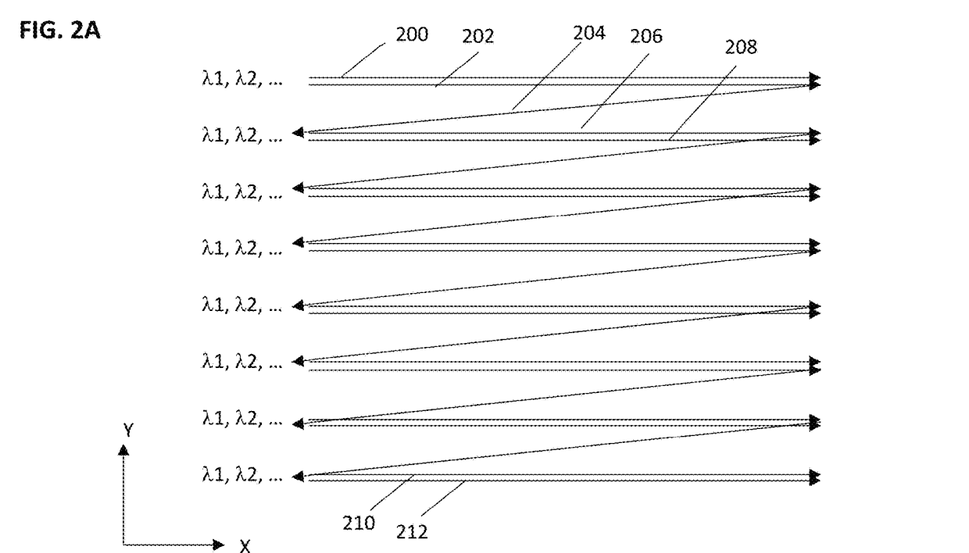
FIG. 2A is a conceptual simplified block diagram of method of improved composite multi-wavelength photothermal imaging.

The following description, and the embodiment depicted in FIG. 2A, shows individual lines scanned sequentially. However, any suitably sized portion could be scanned at one wavelength and then another wavelength, and still address the problem of avoiding excessive thermal drift. For example, a portion including at least one line could be scanned at a first wavelength and then a second wavelength. Two or three lines could be scanned at the first wavelength before switching to the second wavelength in some embodiments. In other circumstances, a portion could be a partial line, or the two wavelengths of the pump beam can alternate even on a pixel-by-pixel basis.

The portion size is an amount of sample that can be scanned in less time than an acceptable level of expected thermal drift or other movement. In embodiments, the portion size can be calibrated for a particular type of sample, such as by measuring variability in measured scan data and adjusting the size of the portion accordingly. For example, a portion may be set as three lines originally, but excessive artifacts from thermal drift may cause the portion to be adjusted to two lines for that sample or class of sample. Such adjustments can be made over the course of a single sample scan, or over multiple scans. Past results can be used to set portion sizes for subsequent scans, either manually or through machine learning or other feedback and training protocols, based on sample type, temperature, or other inputs.

Figure 2B:
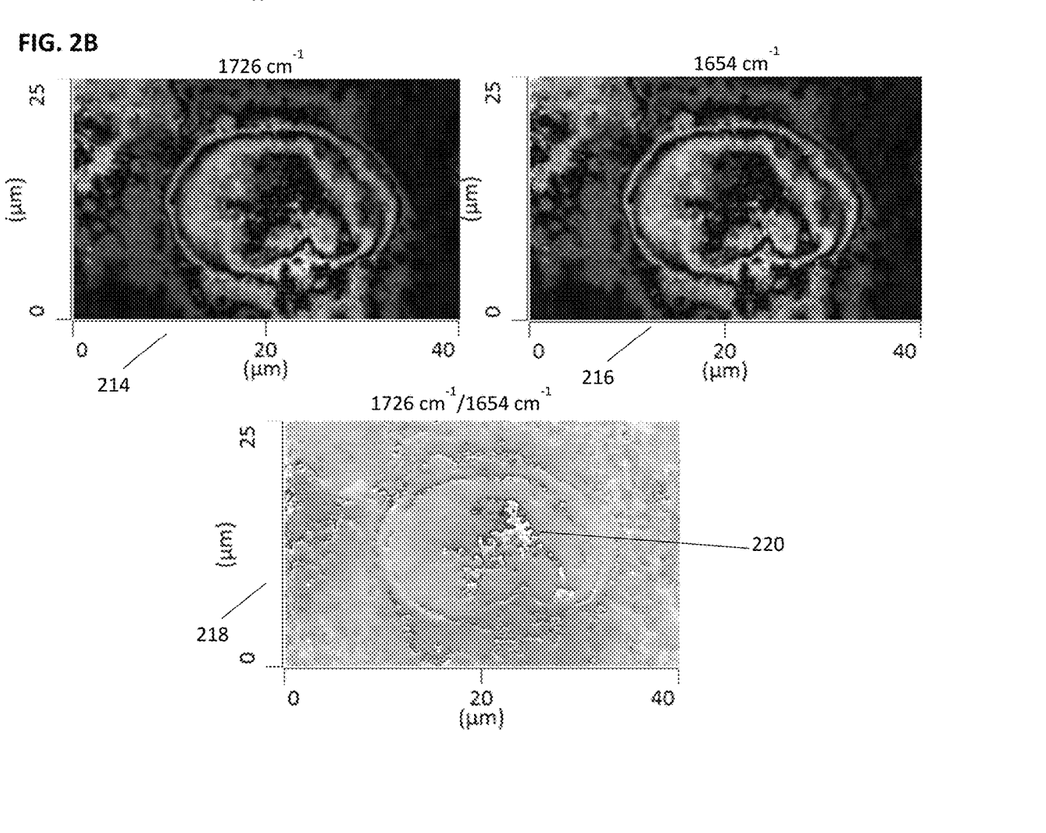
FIG. 2B shows single wavelength OPTIR images and a ratio image of a sample as measured according to the scan pattern of FIG. 2A.

FIGS. 2A and 2B show a simplified schematic diagram of a method of achieving improved composite multi-wavelength photothermal IR imaging using rapid wavelength shifting. FIG. 2A shows a modified raster scan pattern where the same scan line is measured two or more times while rapidly shifting the infrared wavelength before repeating the scan line. In this case, an OPTIR measurement is made across a first sample scan line 200 at a first wavelength $\lambda 1$, and then substantially the same scan line is rescanned after changing the infrared wavelength to $\lambda 2$. Scan lines 200 and 202 are shown vertically offset slightly for clarity, but in practice it is preferable if these scan lines follow the same trajectory across the sample as close as possible. Similar rescan patterns have been used for example in the atomic force microscopy community, for example as described in U.S. Pat. No. 5,418,363A, hereby incorporated by reference, to perform successive measurements of the same sample scan line while alternately measuring two different sample properties, for example surface topography and magnetic field strength.

It is also preferable that scan lines 200 and 202 (and all successive scan line pairs) are measured with a very short time between the first scan at 21 and a second rescan at 22. An optimal delay between rescans should be shorter than the critical time that would lead to unacceptable drift between successive scans, for example less than 5 seconds, or less than 1 second. While the example above is illustrated with just two IR wavelengths, $\lambda 1$ and $\lambda 1$, in practice this rescanning process can be repeated for as many infrared wavelengths as desired. Once all desired infrared wavelengths are measured, the return scan line 204 will position the start of scan at the same X value as for lines 200/202, but at an incremented Y value. A new set of forward scan lines (e.g., 206, 208) are then acquired at the same desired wavelengths 21, 22, are acquired, and the process is iterated until the forward scan of the final pair of lines (e.g., 210, 212). At this point the OPTIR system will have acquired at least two (or more) OPTIR images at different infrared wavelengths, and the time between the scan lines at different wavelengths are preferably shorter than the amount of time required to incur a problematic amount of thermal drift.

FIG. 2B shows an image set similar to that shown in FIG. 1B, but in FIG. 2B the images have been obtained with the relatively more rapid wavelength shifting between alternating scan lines in the image, per the method described associated with FIG. 2A. While the single wavelength images 214 and 216 look similar to their counterpart images 108 and 110 in FIG. 1A, the ratio image 218 shows much higher fidelity with artifacts associated with thermal drift substantially reduced or eliminated. Ratio image 218 also has done a much better job in normalizing for spatially varying sample properties, thus producing an image much more indicative of true IR absorption contrast and thus much more indicative of the distribution of different chemical species. Image 214 and 216 are obtained at IR bands corresponding to lipid (1726 cm$^{-1}$) and protein (1654 cm$^{-1}$) thus ratio image 218 shows contrast that is indicative of regions of the cell that have high relative concentration of lipids, for example the region 220 indicated.

Figure 3:
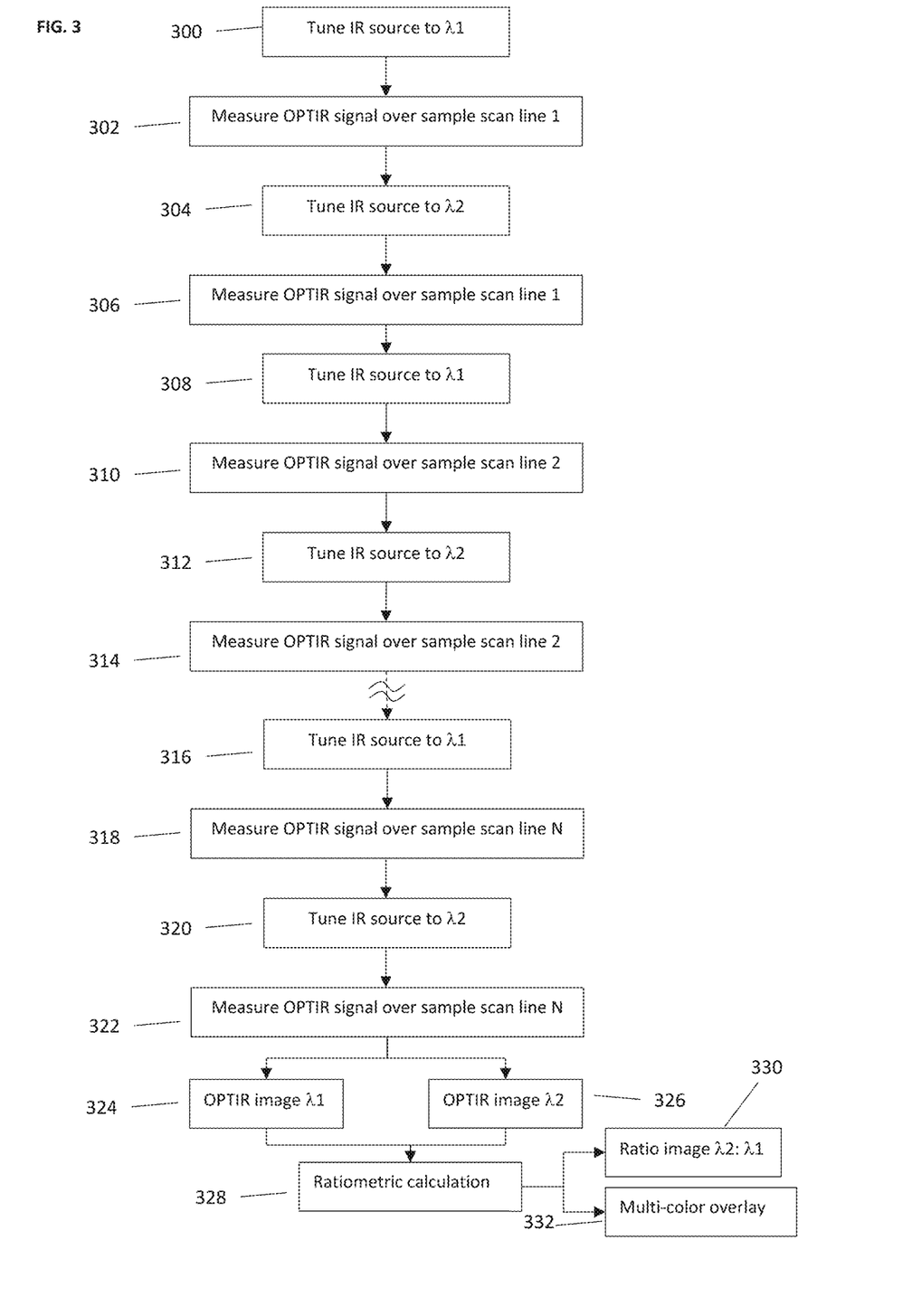
FIG. 3 is an example flowchart of a method for improved composite multi-wavelength photothermal imaging according to two embodiments.

FIG. 3 shows a simplified flow chart for improved composite multi-wavelength photothermal infrared imaging. The flow chart of FIG. 3 shows two outputs: one or more ratio images (330) or one or more multi-color overlay images (332). Because the flow chart for creating these outputs is substantially identical they are depicted in the same figure. It should be understood that by following the flow chart shown in FIG. 3 an operator could produce just one of the ratio images (330) or the multi-color overlay images (332).

At 300 the IR source is tuned to a first wavelength $\lambda 1$ and then at 302 the OPTIR signal is measured while scanning over a first scan line of the sample. As described above, while the method of FIG. 300 describes an example where one line at a time is scanned, in alternative embodiments a portion including multiple lines (but less than the whole of the sample) could be scanned. The size of the scanned sample within the portion is selected to keep thermal drift below an acceptable threshold.

The IR source is then rapidly tuned to $\lambda 2$, and the first scan line of the sample is rapidly rescanned at 306, preferably with a sufficiently short time delay from the first scan at $\lambda 1$ based on thermal drift within the sample. This wavelength tuning and line rescanning is repeated for as many wavelengths as desired (only two wavelengths $\lambda 1$ and $\lambda 2$ are shown for simplicity.) After OPTIR measurements are performed for the first scan line at all desired wavelengths, the IR source is retuned to the first wavelength $\lambda 1$ and the OPTIR signal is measured over a second scan line at 310. The wavelength is again tuned to $\lambda 2$ and the second line is rescanned at 314 as before for the first scan line. This process is repeated until a desired number of N scan lines are all measured at all desired wavelengths at 316, 318, 320, and 322. At the end of this process, the acquisition process will have created at least two images obtained at at least two IR wavelengths $\lambda 1$ and $\lambda 2$, and any additional IR wavelengths desired (just two images 324 and 326 are shown for simplicity). At 328 one or more composite multi-wavelength image calculations are performed to produce for example one or more ratio images (330) and/or one or more multi-color overlay images (332).

In an alternate embodiment the scheme shown in FIG. 3 can be modified to scan a small number of scan lines, e.g. less than 10 scan lines at the first wavelength $\lambda 1$ and then the same less than 10 scan lines can be rescanned at $\lambda 2$. This approach can be preferable when the tuning time of the IR source is longer and one wishes to reduce the overhead associated with laser tuning time. This number of scan lines that can be scanned at $\lambda 1$ before rescanning at 22 will depend on the thermal drift in the system which can be dependent on the instrument design and the laboratory environment where the instrument is used. But as an example consider a drift rate of 5 µm/minute and suppose an image offset of less than 0.5 µm is desired between the first and second wavelength OPTIR images. This would provide a total of (0.5 µm/5 µm/minute)=0.1 minutes=6 seconds to acquire portions of the images at the first or second wavelengths. If the image scan rate is 1 line per second, it would be possible to scan 6 lines at λ1 before rescanning the same six lines at λ2. The number of lines that could be scanned would be proportionally increased if the drift rate was lower. In practice, as mentioned above, thermal drift rates are often not constant, but a measurement of a maximum typical drift rate can be used to inform appropriate selection of the portion size. The other factor influencing the portion size can be the tuning time for the IR source. If the tuning time is nearly instantaneous, then it will be generally preferable to make the image portion size small, e.g. switching wavelength every scan line. If the IR tuning time is long, it is desirable to make the image portion size large, e.g. many lines, to reduce the number of times the IR laser must be retuned.

Figure 4:
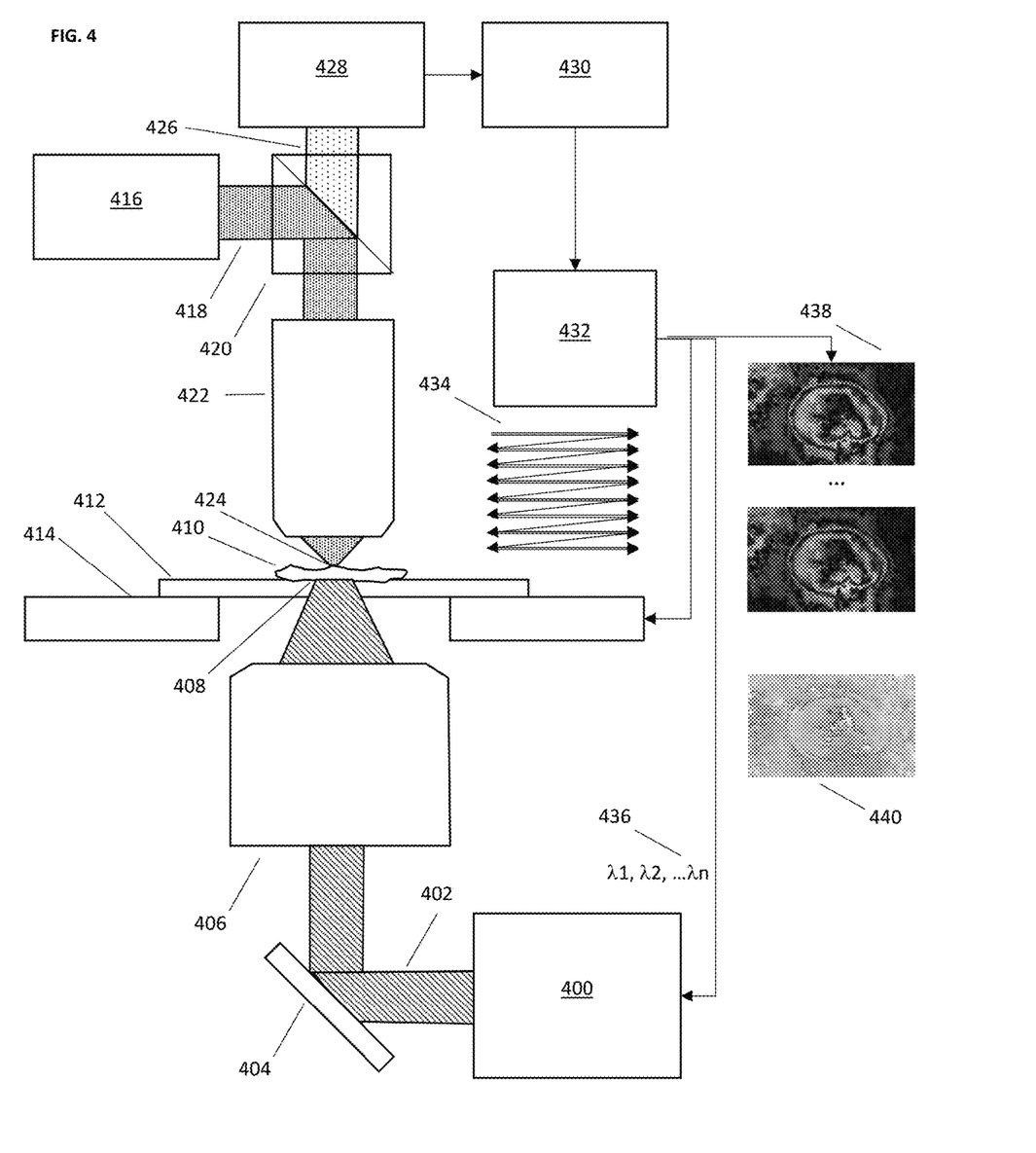
FIG. 4 is an example of a system for improved composite multi-wavelength imaging to reduce effects of thin film interference.

FIG. 4 shows a simplified schematic diagram of an OPTIR apparatus that can be employed for improved composite multi-wavelength photothermal infrared imaging as described above. FIG. 4 shows an embodiment for counter-propagating OPTIR, but many alternative OPTIR arrangements including but not limited to a co-propagating configuration, widefield OPTIR, interferometric detection, and other embodiments can support the rapid wavelength switching approach for improved composite multi-wavelength imaging as described herein. The embodiment shown in FIG. 4 includes a tunable infrared light source 400 that produces a beam of infrared radiation 402. The IR radiation 402 may be incident on any number of fixed or moving mirrors (e.g. 404) is optionally incident on any number of optical and/or optomechanical elements (not shown) for modulation, beam conditioning, beam expansion, beam power attenuation, beam steering etc. These may include fixed and/or moving mirrors, polarizers, wave plates, lenses, fixed and/or movable mirrors, beam splitters, dichroics, galvo scanners, etc. After any number of optional optical/optomechanical components, the IR beam is directed to the infrared focusing optic 406. The infrared focusing element may comprise any number of reflective and/or refractive optical elements to focus the infrared light to a spot 408 on a sample or specimen 410. Suitable infrared focusing elements include reflective objectives of a Schwarzschild or similar design, infrared transparent refractive objectives, infrared transparent lenses and lens assemblies, off-axis parabolic mirrors or any other optic or collection of optics that can focus infrared light to sample 410. Sample 410 is often supported by a substrate 412 that can provide mechanical support for the sample. In the configuration shown, substrate 412 is generally transparent to infrared radiation over at least a range of mid infrared wavelengths of interest. The substrate 412 is in turn supported by a sample stage 414 that is generally movable and or scannable.

The sample is simultaneously illuminated with a beam of probe radiation as described following. A source of probe radiation 416 emits a probe beam 418 that is optionally incident on any number of optical and/or optomechanical elements (not shown) for modulation, beam conditioning, beam expansion, beam power attenuation, beam steering etc. These may include fixed and/or moving mirrors, polarizers, wave plates, lenses, fixed and/or movable mirrors, beam splitters, dichroics, galvo scanners, etc. In one embodiment the probe beam 418 may be incident on a beam splitter 420 that directs at least a portion of the probe beam to an objective 422 which in turn focused probe light to a spot 424 onto sample 410 at least partially overlapping the infrared spot 408. Probe light scattered, reflected, and or transmitted after interacting with the sample is collected by one of more collecting optics, which in different embodiments can comprise IR focusing optic 406, probe beam objective 422 and/or other collection optics not shown. In the embodiment shown, forward scattered ("epi") probe light is collected by probe beam objective 422, passed through beam splitter 420 such that at least a portion 426 of probe light from the sample is incident on one or more detector 428.

When the wavelength of infrared source 400 is tuned to a wavelength corresponding to an infrared absorption band in the sample 410, IR absorbing regions of sample 410 will increase in temperature, causing a photothermal distortion in the sample. The photothermal distortion may comprise change in index of refraction with temperature and/or thermal expansion of the sample. Either or both of these effects can change the intensity, angular distribution, and/or optical phase of the probe light scattered, reflected, and/or transmitted by the sample. Thus the probe light detected at detector 428 can change in response to IR absorption by the sample. More specifically, the probe beam is used to measure a signal indicative of the sample temperature rise at focused spot 424 due to absorption of IR radiation. The signal from detector 428 is optionally amplified and conditioned for example with high pass, low pass, and/or band-pass filters and optionally sent to demodulator 430 to produce signals indicative of the intensity of the photothermal distortion, i.e. indicative of the temperature rise in the sample due to IR absorption by the region of the sample under the probe beam. Signals produced by demodulator 430 are then sent to a controller and/or computer 432 for further signal processing and analysis. Controller/computer 432 can also be used to coordinate the improved composite multi-wavelength data acquisition by sending appropriately synchronized commands to the sample stage 414 and the IR source 400. Specifically, the controller/computer 432 can send a raster scan pattern 434 similar to that shown in FIG. 2A. while sending synchronized control signals 436 to IR source 400 to rapidly sequence between the desired wavelengths λ1, λ2, . . . λn while repeatedly scanning the same scan line of the sample 410 before incrementing to the next scan line in the Y direction, as described associated with FIG. 2A. Synchronization signals can also be provided between the controller 432, the sample stage 414 and the demodulator 430. For example in one embodiment the controller 432 can be configured to emit synchronization pulses at periodic position intervals of the sample stage 414, for example every 100 nm of sample scan movement. These synchronization pulses can be directed to the demodulator 430 to trigger transfer of OPTIR signal intensities at specified increments of sample movement, e.g. every 100 nm. These synchronization pulses can be disabled and/or ignored on the return scan. Another important synchronization feature is to ensure that the IR source 400 is emitting stably at the desired wavelength prior to initiating a rescan or scan of a subsequent scan line. The controller 432 can monitor signals from the IR source 400 to verify stable emission before initiating the next scan/rescan. It may also be desirable to adjust the focus position of IR focusing optic 406 between different IR wavelengths, especially if the IR source has different beam divergence as a function of emission wavelength and/or if the IR focusing optic 406 has dispersion, i.e. a wavelength dependent focal length. Controller 432 can automatically initiate wavelength dependent focus shifts for IR focusing optic 406 to compensate for any of these effects. In this case, the controller 432 may also poll or otherwise monitor position control hardware (not shown) for focusing optic 406 to ensure that it is at the desired focus position before initiating the scan/rescan at a new IR wavelength.

Controller 432 may comprise one or more computational and/or controlling elements. For example it may comprise one or more CPU, digital signal processors (DSP), field programmable gate arrays (FPGA), microcontrollers, etc to together or separately provide the scan signal generation, rapid wavelength shifting and ratiometric and/or image overlay computation desired. Controller 432 may comprise one or more electronics cards in a single chassis or be separated into multiple electronics enclosures, for example one or more stage controllers, on or more data acquisition/control electronics boxes, and one or more computers. Controller 432 shown as a single box in FIG. 4 is intended to encompass any variation of single multiple controlling/computational electronics in one or more enclosures. Note that demodulator 430 which is shown as a separate box in FIG. 4 may also be incorporated within the functionality of controller 432.

In the description above, the relative sample/probe beam motion was generated by moving the sample via sample stage 414. It is possible to equivalently move the probe beam spot 424 and optionally the IR spot 408 using beam scanning approaches for example used in laser scanning microscopy. In this case, the controller 432 would initiate synchronized scanning of one or more fast beam steering mirror and or galvo scanner to induce motion of at least the probe beam across a plurality of locations on the sample. The synchronization with the demodulator 430 can be provided by synchronization pulses emitted by controller 432 and/or by the motion controller used to generate motion of the fast beam steering mirror or galvo scanner.

Figure 5:
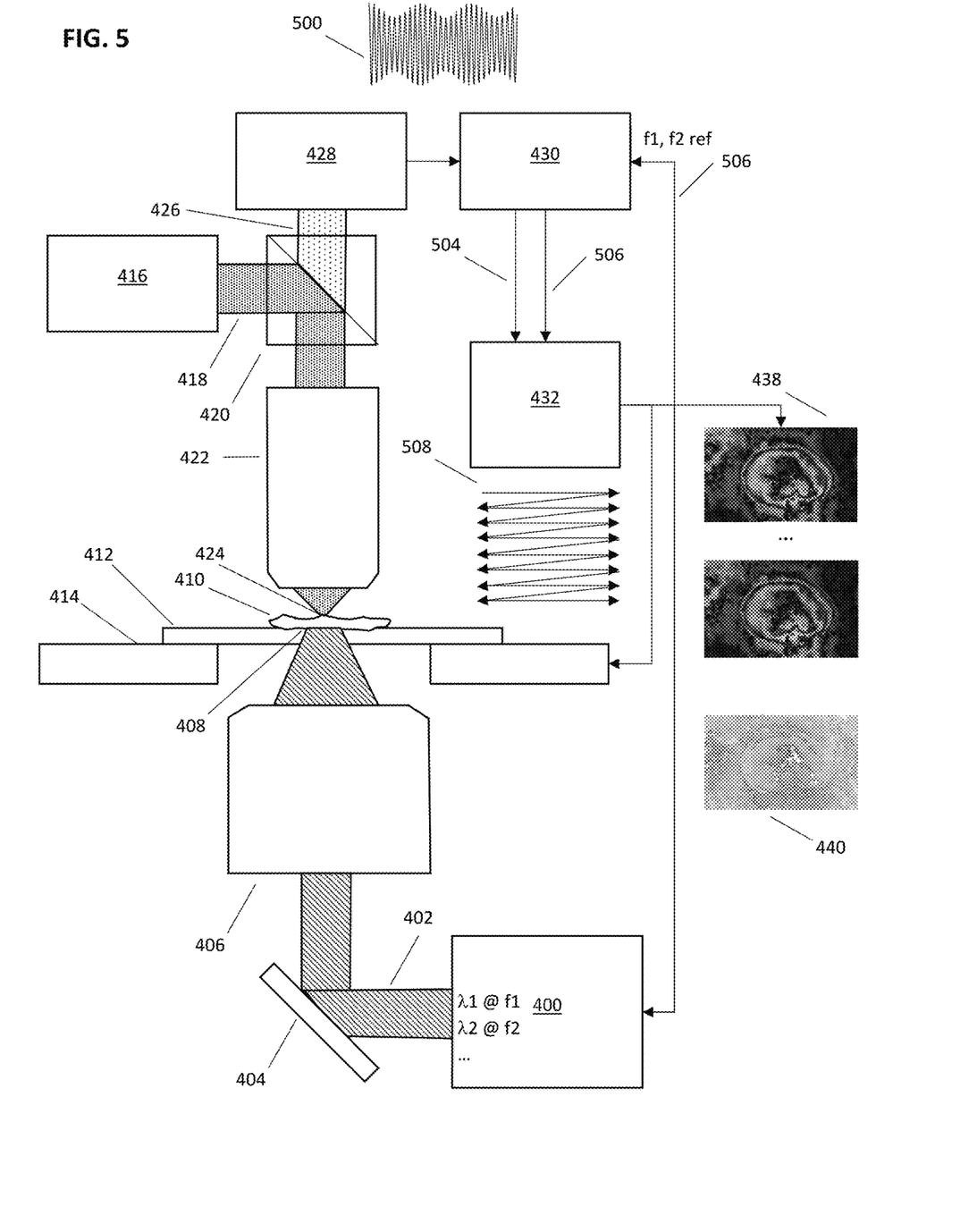
FIG. 5 depicts an example system in which OPTIR signals are measured at multiple wavelengths simultaneously.

FIG. 5 shows an alternative embodiment where instead of rescanning the same line at two or more different wavelengths, OPTIR signals can be measured at two or more wavelengths simultaneously during the same scan line. FIG. 5 is based on FIG. 4 and where the same numeric callouts are used, the discussion associated with FIG. 4 applies as appropriate. In FIG. 5, the IR source 400 emits two wavelengths at the same time, but the IR pulse trains are separated either in the frequency or time domain. For example, in one embodiment, light at IR wavelength $\lambda 1$ can be pulsed or modulated at a first frequency f1 (e.g 100 kHz), whereas light at IR wavelength $\lambda 2$ can be pulsed at a second frequency f2 (e.g. 110 kHz). When light from these two IR wavelengths is incident on the sample, it will produce a photothermal response at one or both frequencies f1 and f2 (and often at a certain number of higher harmonics of these frequencies.) This in turn will modulate the collected probe beam 426 incident on detector 428 at the same frequencies. The signal from detector 428 will then contain a composite multi-frequency response 500 that will contain the photothermal response at both IR wavelengths 21 and 22 at frequencies f1 and f2 and their harmonics. This composite multifrequency signal 500 can be then demodulated by demodulator 430 at the two different frequencies simultaneously by supplying two separate reference signals 506 at the two different modulation frequencies f1 and f2. The demodulator 430 will then produce two or more signals 504 and 506 corresponding to the demodulated responses at the two IR pulse frequencies and hence corresponding to the two IR wavelengths. This approach can also be generalized for any number of IR wavelengths using a multi-channel lock-in amplifier and/or multiple lock-in amplifiers. It is preferable that the modulation frequencies of the different IR wavelengths are not integer multiples of each other to avoid higher harmonic components of a response at one wavelength appearing in the detection bandwidth of a different IR wavelength. One suitable IR sources for simultaneous IR emission at two or more wavelengths simultaneously are manufactured for example by Block Engineering. Block Engineering supplies compact external cavity laser modules that can be operated independently to permit simultaneous emission at two or more different IR wavelengths. Individual quantum cascade laser modules and/or other infrared sources can be combined with appropriate dichroic mirrors to support simultaneous multi-wavelength excitation. Note that in a simultaneous multi-wavelength illumination, it is not necessary to use a double scan arrangement as shown in FIGS. 2-4. Instead a conventional raster, scan pattern 508 can be used.

Figure 6:
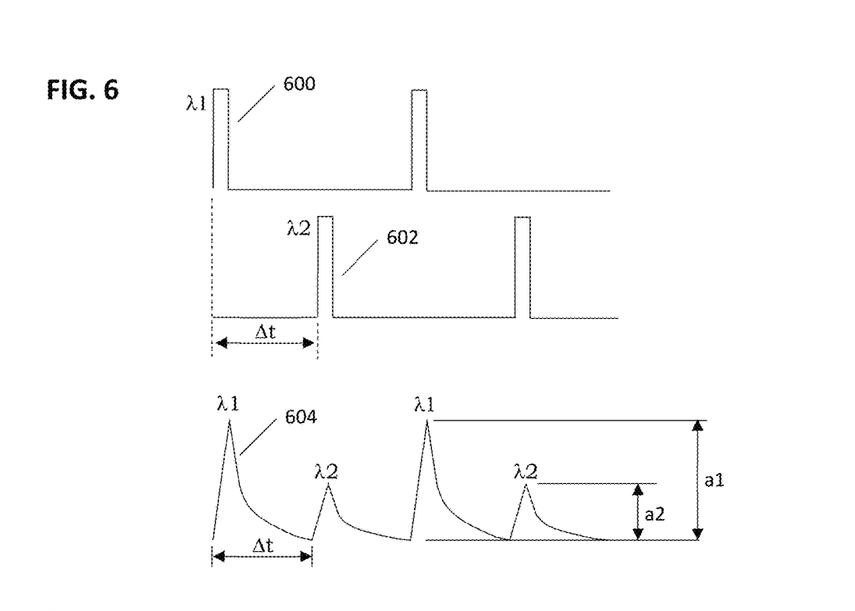
FIG. 6 shows trigger pulses used to generate IR emission at two different wavelengths according to an embodiment.

Multi-wavelength OPTIR imaging may also be accomplished using segregation in the time domain. For example IR pulses can be provided at the same repetition rate at two different wavelengths, but with an established time delay between the pulses at $\lambda 1$ versus the pulses at $\lambda 2$. FIG. 6 illustrates a such a scheme where two separate emission trigger pulses 600 and 602 are applied to generate IR emission at two different wavelengths $\lambda 1$ and $\lambda 2$. Pulse train 600 shows the IR pulse triggers for IR wavelength $\lambda 1$ whereas pulse train 602 shows the IR pulse triggers for IR wavelength $\lambda 2$. There is preferentially a fixed time delay $\Delta t$ between the two trigger pulses. An example photothermal response is illustrated in time domain response 604 showing a stronger photothermal signal at $\lambda 1$ and a weaker response $\Delta t$ later corresponding to a smaller IR absorption at $\lambda 2$. These photothermal responses can be extracted from the time domain response 604 using any of a number of time domain demodulation approaches including but not limited to approaches described below. One suitable demodulation approach, for example, can be accomplished by measuring the peak to baseline amplitudes a1 and a2 using appropriate time gating. For example within the first window $\Delta t$, it is possible to measure the peak-to-peak amplitude, or the difference between the signal at the beginning and end of the $\lambda 1$ IR pulse, the integrated area under the $\lambda 1$ pulse/decay waveform, or any other suitable analysis of the time domain response corresponding to the $\lambda 1$ pulse to extract an amplitude a1 of photothermal response at the first wavelength. This process can then be repeated for $\lambda 2$, starting with time domain windows that are shifted by $\Delta t$. Note that is also possible and often desirable to average the measured photothermal response over a plurality of $\lambda 1$ and $\lambda 2$ pulse responses to improve signal-to-noise. This can be accomplished by averaging together multiple $\lambda 1$ or $\lambda 2$ responses separated by $2\Delta t$ or by averaging together a plurality of single pulse a1 and a2 responses over multiple $\lambda 1$ and $\lambda 2$ IR pulses. And as before this example has just included two wavelengths and two IR pulse trains, but this approach can be generalized to any number of IR wavelengths.

Figure 7:
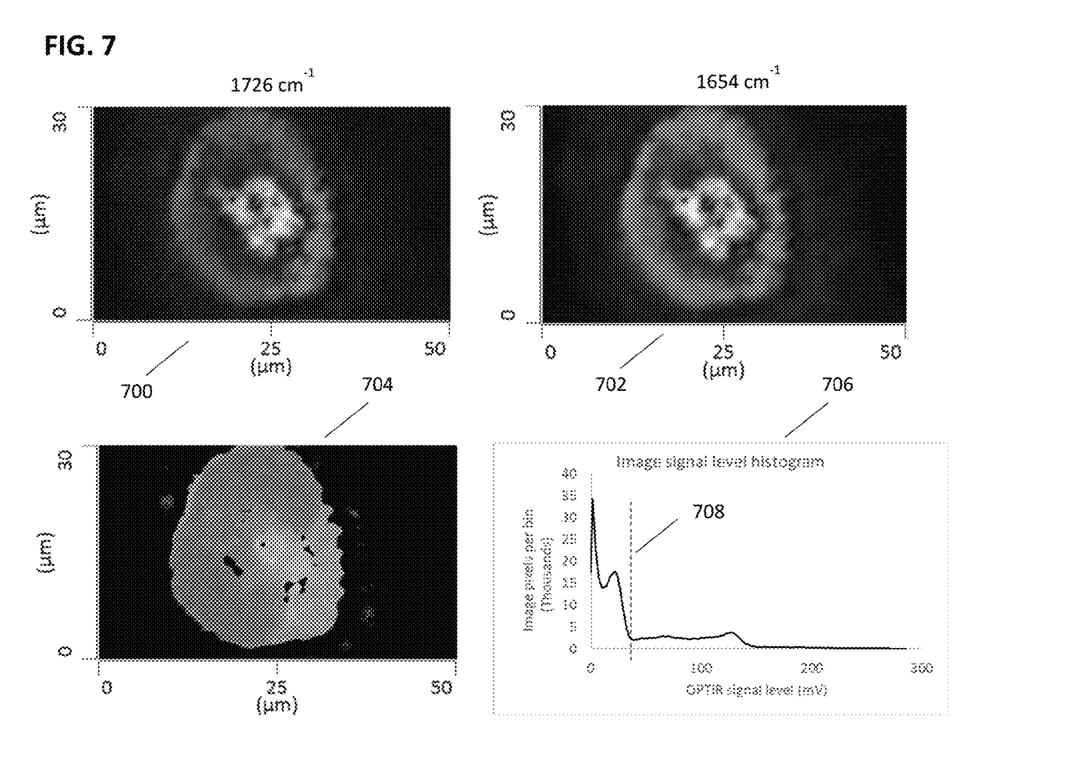
FIG. 7 shows outputs from a multi-wavelength composite image generation using a modified ratiometric approach.

FIG. 7 shows another example of a multi-wavelength composite image generation using a modified ratiometric approach similar to the approach outlined in FIG. 2. FIG. 7 shows two single wavelength OPTIR images 700 and 702 of a biological cell obtained at two different wavelengths corresponding to 1726 cm$^{-1}$ (700) and 1654 cm$^{-1}$ (702) using the rapid wavelength switching every scan line as described associated with FIGS. 2-3. Ratio image 704 was calculated by dividing image 700 by image 702 with an additional feature where the result is set to zero) if the signal level is below a minimum signal threshold. This avoids situations of generating high noise signal at image the values in the denominator image 702 are close to zero. These pixels are set to black in the image 704 indicating regions where the denominator level was too low for a ratio calculation to be performed with confidence. This for example makes the substrate background away from the cell black, and also a few isolated areas within the cell sample where there was insufficient signal.

Ratio image 704 shows that in some cases the approach described herein can almost completely suppress thin film interference effects. Both single wavelength images 700 and 702 show some contrast elements associated with thin film interference, i.e. semi-periodic variation in OPTIR sensitivity with thickness, for example the dark halo around the center of the cell. The ratio image 704 almost completely suppresses the effects of this variable OPTIR sensitivity with thickness and thus suppresses the thin film interference.

The minimum signal threshold can be user-selectable or can be determined automatically. For example the minimal signal threshold can be set to be some multiple of the signal noise floor (for example three times the noise floor). Another way to set the minimum noise threshold can be from a histogram of pixel signal values in the image. An example histogram 706 is shown in FIG. 7 that shows the number of image pixels as a function of the OPTIR signal level for image 702. Image 702 has two distinct regions, one corresponding to the calcium fluoride substrate (dark black) and another region associated with the signal levels over the biological cell in the image. Histogram 708 also reflects these two regions, with lower OPTIR signal levels to the left of threshold 708 corresponding to the calcium fluoride substrate and higher levels to the right of threshold 708 corresponding to the signal levels associated with the cell. Thus the histogram boundary, i.e. threshold 708 makes a suitable minimum signal threshold for excluding pixels from the ratio image 704. This minimum signal threshold can be set automatically, for example by finding a change in slope in the histogram curve. This approach can then readily distinguish between sample and substrate providing an optimal exclusion region for the denominator in the ratio image.

Note that while it is preferable to set sub-threshold values in the ratio image to zero, alternative approaches can accomplish the same goal of suppressing regions in the ratio image where the denominator is too low. For example it is possible to set these pixel regions to a fixed non-zero value (e,g, a fixed negative number or fixed positive value sufficiently below other values in the ratio image). It is also possible to attenuate the pixel values for regions where the denominator image is below the minimum signal threshold. For example pixels in the ratio image that are below the minimum signal threshold can be divided by some factor, e.g. 100, to compress those pixels into the lower portion of the color palette while retaining the desired ratio contrast in other areas of the image. All of these approaches of setting pixels values to zero, to a fixed value, and/or attenuating pixel values accomplish the goal of suppressing regions of the ratio image where the denominator in the image ratio is below a signal level threshold.

In one example, a method for performing composite multi-wavelength imaging of a sample includes illuminating the sample with a beam of infrared radiation at a first infrared wavelength and with a pulse repetition rate and simultaneously illuminating the sample with a beam of infrared radiation at a second infrared wavelength at the pulse repetition rate and with a time delay between pulses at the first and second infrared wavelengths. The method further includes measuring with a probe beam an infrared photothermal response signal resulting from infrared absorption by the sample and performing a time domain demodulation on the photothermal response signal to determine a strength of photothermal response in the sample at the first and second infrared wavelengths. The method includes scanning a plurality of scan lines over the sample to produce images of photothermal response in the sample at the first and second wavelength.

The images of photothermal response in the sample at the first and second wavelength can be ratiometric images. The images of photothermal response in the sample at the first and second wavelength can be multicolor images. Calculating a ratio of the images can produce an image that substantially normalizes for variations in OPTIR sensitivity across the sample.

We claim:

1. A method for performing composite multi-wavelength imaging of a sample, the method comprising:
    a) illuminating a sample of with a beam of infrared radiation at a first infrared wavelength;
    b) acquiring a portion of an OPTIR image of the sample at the first infrared wavelength wherein the portion comprises at least one scan line;
    c) then illuminating a sample of with a beam of infrared radiation at a second infrared wavelength;
    d) scanning substantially the same portion as b) while acquiring an OPTIR signal at the second infrared wavelength; and
    e) then repeating a-d at a plurality of additional scan lines on the sample to produce at least two OPTIR images of the sample at the first and second infrared wavelengths; and
    f) calculating a ratio of the two OPTIR images at the first and second wavelengths.

2. The method of claim 1, further comprising producing a multi-color overlay image comprising OPTIR images at the first and second wavelengths as at least two layers of the multi-color overlay image.

3. The method of claim 1 wherein a-d are performed with a time delay that is shorter than a time required to cause substantial drift between the scan lines of b and d.

4. The method of claim 1 wherein a-d are performed within a duration of less than 5 seconds.

5. The method of claim 1 wherein a-d are performed with a duration of less than 1 second.

6. The method of claim 1 wherein calculating the ratio produces an image that substantially normalizes for variations in OPTIR sensitivity.

7. The method of claim 1 wherein calculating the ratio produces an image with reduced thin film interference than at least one of the images at the first and second wavelength.

8. The method of claim 1 wherein calculating the ratio further comprises producing a ratio image where ratio image pixel values are modified if signal intensity values in a denominator image used to produce the ratio image are below a signal threshold value.

9. A method for performing composite multi-wavelength imaging of a sample, the method comprising:
    a) illuminating a sample of with a beam of infrared radiation at a first infrared wavelength;
    b) scanning fewer than ten lines of the infrared illuminated sample while acquiring an OPTIR signal at the first infrared wavelength;
    c) then illuminating a sample of with a beam of infrared radiation at a second infrared wavelength;
    d) rescanning substantially the same fewer than ten lines of the sample as b) while acquiring an OPTIR signal at the second infrared wavelength; and
    e) then repeating a-d at a plurality of additional group of fewer than ten scan lines on the sample to produce at least two OPTIR images of the sample at the first and second infrared wavelengths; and f) calculating a ratio of the two OPTIR images at the first and second wavelengths.

10. The method of claim 9, further comprising producing a multi-color overlay image comprising OPTIR images at the first and second wavelengths as at least two layers of the multi-color overlay image.

11. The method of claim 9 wherein a-d are performed with a time delay that is shorter than a time required to cause substantial drift between the scan lines of b and d.

12. The method of claim 9 wherein calculating the ratio produces an image that substantially normalizes for variations in OPTIR sensitivity.

13. The method of claim 9 wherein calculating the ratio produces an image with reduced thin film interference than at least one of the images at the first and second wavelength.

14. The method of claim 9 wherein calculating the ratio further comprises producing a ratio image where ratio image pixel values are modified if signal intensity values in a denominator image used to produce the ratio image are below a signal threshold value.

\* \* \* \* \*